United States Patent [19]

Hoszowski

[11] Patent Number: 4,965,942
[45] Date of Patent: Oct. 30, 1990

[54] DIPSTICK HANDLE

[75] Inventor: Andrew K. Hoszowski, Greenville, Miss.

[73] Assignee: Moeller Manufacturing Co., Inc., Greenville, Miss.

[21] Appl. No.: 509,790

[22] Filed: Apr. 17, 1990

[51] Int. Cl.$^5$ .............................................. G01F 23/04
[52] U.S. Cl. ...................................... 33/730; 33/731; 116/227
[58] Field of Search ................. 33/722, 723, 724, 726, 33/728, 729, 730, 731; 403/71; 73/290 B, 423; 116/227; 24/297, 115 G; 16/110 R, 114 R

[56] References Cited

U.S. PATENT DOCUMENTS

| | | | |
|---|---|---|---|
| 2,449,294 | 6/1948 | Bickle | 33/722 |
| 3,474,884 | 10/1969 | Braun | 33/722 |
| 4,531,293 | 7/1985 | Grinde | 33/729 |
| 4,622,723 | 11/1986 | Krauss | 24/115 G |
| 4,761,886 | 8/1988 | Wilson et al. | 33/722 |
| 4,841,597 | 6/1989 | Kolonia | 16/114 R |

FOREIGN PATENT DOCUMENTS 1090791 4/1955 France ................................. 33/728

*Primary Examiner*—Allan N. Shoap
*Assistant Examiner*—Alvin Wirthlin
*Attorney, Agent, or Firm*—Berman, Aisenberg & Platt

[57] ABSTRACT

A dipstick handle of the invention includes a unitarily molded handle, such as a finger ring, having an integrally molded hollow shaft. The shaft has one or two pairs of opposed slots through its outside surface. A dipstick blade is received by one end of a hollow insert which has two pairs of tabs at its other end for snapping into the slots through the surface of the shaft. Pressure on the tabs engaged in the slots releases the tabs and enables the insert and dipstick blade to be withdrawn. The handle seals the tube into which the dipstick is fitted to avoid escape of noxious gases. The blade may be oriented in any of four directions with respect to a plane of the handle.

14 Claims, 2 Drawing Sheets

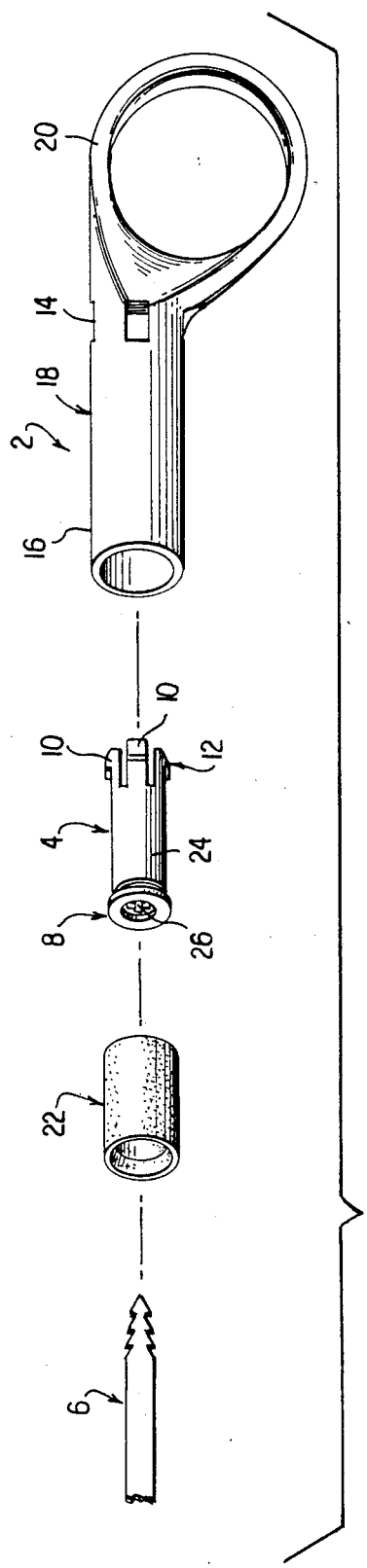
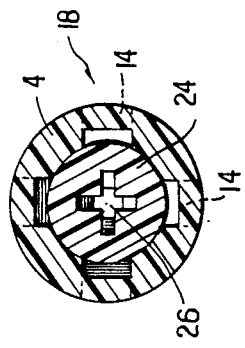
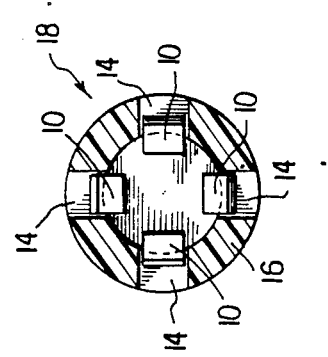
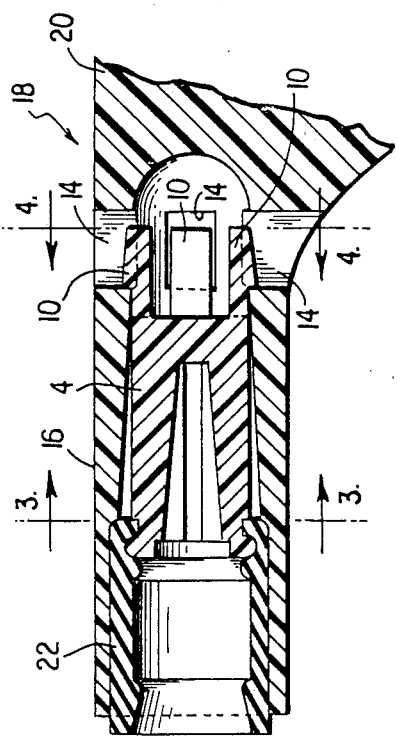
FIG. 1
FIG. 3
FIG. 4
FIG. 2

DIPSTICK HANDLE

FIELD OF THE INVENTION

The invention relates to a dipstick handle for measuring fluid levels in the sumps of engines.

BACKGROUND OF THE INVENTION

Known prior art does not provide a simple unitarily molded handle for a dipstick blade. The patent to Bickle, U.S. Pat. No. 2,443,294 describes a dipstick gauge having an offset finger ring handle into which a dipstick blade is clipped. Grinde, U.S. Pat. No. 4,531,293, describes a gauge receiving a snap-in barbed measuring dipstick. The patent to Wilson, U.S. Pat. No. 4,761,886 describes a dipstick handle which requires a two-piece handle. An insert holding the dipstick blade is inserted through the handle and held, by a pair of lugs, on the upper surface of the hollow shaft. The lugs are held apart, in secured position, by an outward projection of a cap which fits in a recess in the top of the handle.

SUMMARY OF THE INVENTION

A dipstick handle of the invention includes a unitarily molded handle, such as a finger ring, and an integrally molded hollow shaft. The shaft has at least one pair of opposed slots through its outside surface. The dipstick blade is received by, and sealed into, one end of a hollow insert having two pairs of tabs at its other end for engaging in the slots through the surface of the shaft. Pressure on the tabs engaged in the shaft enables the insert and dipstick blade to be withdrawn. The handle seals the tube into which the dipstick is fitted to avoid escape of noxious gases.

The dipstick may be oriented in one of four positions: with the finger ring either parallel or perpendicular to the axis of the engine and with the indicia on the dipstick blade oriented facing upward, for reading by either a left-handed or a right-handed user without turning the blade.

An object of the invention is to provide an improved dipstick handle.

Another object of the invention is to provide a dipstick handle for releasable blade which seals the end of the tube into which the dipstick is fitted.

BRIEF DESCRIPTION OF THE DRAWINGS

FIG. 1 is an exploded perspective view of a dipstick handle of the invention, showing insertion of a dipstick blade.

FIG. 2 is a partial cross-sectional view of the handle shown in FIG. 1.

FIG. 3 is a cross-sectional view taken on line 3—3 of FIG. 2.

FIG. 4 is a cross-sectional view taken on line 4—4 of FIG. 2.

DETAILED DESCRIPTION OF THE INVENTION

Figure 5:
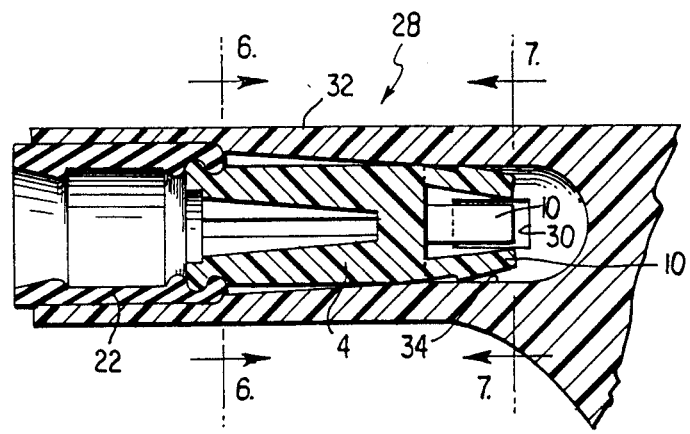
FIG. 5 is a partial cross-sectional view of another handle of the invention.

An improved dipstick handle of the invention has a one-piece unitarily molded plastic handle which is heat and oil resistant. The gripping portion and shaft of the handle are formed in a single molding, and the handle is simple and economical to make. The gripping portion preferably includes a finger ring, but other appropriate configurations for gripping easily will be apparent to one skilled in the art.

The dipstick blade is held by, and may be welded to, one end of an insert having four outwardly extending flexible tabs or lugs symmetrically oriented at its other end. The welding is preferably accomplished by sonic welding, or by other methods known in the art, which do not allow crankcase or other gases to escape through the weld. The end of the blade, which may be barbed, is inserted into a blind slot in the insert and welded in place. The insert is then entered into the hollow shaft of the handle and sealed by means of a rubber or synthetic flexible sealing cap held by a groove around the insert, thus sealing the shaft of the handle. The sealing cap slips over the end of the dipstick holding tube when the dipstick is inserted and positively seals the end of the tube in which the dipstick is placed to measure the level of fluid in an engine sump, thereby avoiding escape of noxious gases into the atmosphere.

At least two of the outwardly extending flexible tabs of the insert engage in slots extending through the wall of the hollow shaft of the handle. Either one pair or two pairs of diametrically opposed slots may be provided for receiving the tabs, and if only one pair of slots is provided the second pair of tabs rest against the inner wall of the shaft. The tabs are releasable by finger pressure from the outside of the shaft so that the insert and dipstick blade may be withdrawn from the shaft and reoriented according to convenience. The blade will generally be oriented parallel to the plane of a finger ring handle, but may be oriented perpendicular to the plane of the handle, for convenience in gripping. If the blade has indicia on one face of the blade only, the insert is able to be oriented with the indicia facing upward when the blade is withdrawn, irrespective of whether the user is right handed or left handed. Thus, the insert may be positioned in the handle with the tabs in any of four positions with respect to the plane of the handle.

With reference to the drawings, in which like numerals represent like parts, FIG. 1 shows an exploded view of handle 2 of the invention. Insert 4 receives dipstick blade 6 in one end 8 thereof. Four tabs 10 extend outwardly from the other end 12 of insert 4. At least two slots 14 extend in diametrically opposed positions through the wall of hollow shaft portion 16 of handle molding 18 for receiving tabs 10, when handle 2 is assembled. Shaft portion 16 is preferably integrally molded with finger ring 20 to form handle molding 18. While a finger ring is preferred for ease of gripping, alternative configurations will be apparent to one skilled in the art.

In use, dipstick blade 6, which may be of metal or plastic is inserted in end 8 of insert 4 and secured by welding or other means. Flexible seal 22 holds insert 4 in position in shaft portion 16.

FIGS. 2 to 4 show an embodiment in which four slots 14 are located symmetrically, in diametrically opposed positions, in shaft 16 of handle molding 18. The figures show the assembly with the dipstick blade omitted, for clarity. Tabs 10 engage slots 14. Pressure on tabs 10 from the outside of shaft 16 releases the tabs from the slots and the blade 6 and insert 4 may be withdrawn from handle molding 18.

FIGS. 3 and 4 illustrate end 24 of insert 4 engaged with tabs 10 extending in four symmetrically placed slots 14 in shaft 16. End 24 of insert 4 has cross-shaped portion 26 cut therefrom. Cross-shaped portion 26 receives dipstick blade 6 with the plane of the blade disposed either substantially parallel or substantially perpendicular to the plane of finger ring portion 20, according to need.

Figure 6:
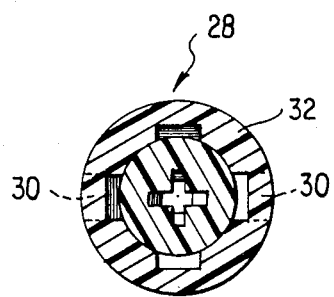
FIG. 6 is a cross-sectional view taken o line 6—6 of FIG. 5.
Figure 7:
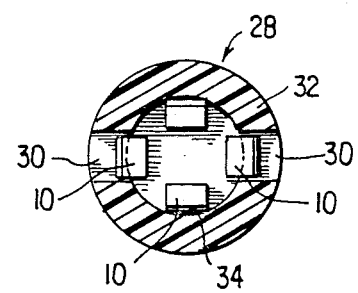
FIG. 7 is a cross-sectional view taken on line 7—7 of FIG. 5.

FIGS. 5 to 7 illustrate handle molding 28 having two diametrically opposed slots 30 in hollow shaft portion 32 for receiving two of the tabs 10. The remaining two tabs 10 which are not engaged with slots 30 rest against an inside surface 34 of hollow shaft portion 32. To release the insert and blade only two tabs need to be released.

Using the dipstick handle of the invention allows economy of manufacturing costs. The cost of molding a handle is far greater than the cost of molding an insert. Only a different insert need be molded for different sizes of blades, without needing a different handle. Thus blades of various sizes, shapes and materials may be used with a standard handle.

While the invention has been described above with respect to certain embodiments thereof, it will be appreciated that variations and modifications may be made without departing from the spirit and scope of the invention.

What is claimed is:

1. A dipstick handle comprising:
   means for gripping comprising a gripping portion and a hollow shaft, said shaft comprising a pair of slots extending through a side wall portion thereof; and
   means insertable in said hollow shaft for receiving a dipstick blade, said insertable means comprising means for releasably engaging said slots in said side wall portion of said shaft, whereby said dipstick blade may be oriented in any of at least two directions with respect to said gripping portion and said insertable means may be released from said shaft by pressure exerted through said slots on said releasably engaging means.

2. A dipstick handle according to claim 1 wherein the gripping means is a single piece comprising the gripping portion and the hollow shaft.

3. A dipstick handle according to claim 2 wherein the gripping means is a single molding.

4. A dipstick handle according to claim 3 wherein the gripping portion comprises a finger ring.

5. A dipstick handle according to claim 2 further comprising sealing means for engaging between said dipstick blade receiving means and said shaft.

6. A dipstick handle according to claim 5 wherein said releasably engaging means comprises tabs for releasably engaging said slots.

7. A dipstick handle according to claim 6 wherein said insertable means further comprises means for receiving said sealing means.

8. A dipstick handle according to claim 7 wherein said slots are disposed in diametrically opposed positions.

9. A dipstick handle according to claim 8 further comprising a second pair of diametrically opposed slots.

10. A dipstick handle according to claim 8 wherein said releasably engaging means comprises pairs of diametrically opposed tabs.

11. A dipstick handle according to claim 9 wherein said releasably engaging means comprises two pairs of diametrically opposed tabs.

12. A dipstick handle according to claim 10 further comprising a dipstick blade.

13. A dipstick handle according to claim 11 further comprising a dipstick blade.

14. A dipstick handle comprising:
   unitarily molded means for gripping comprising a finger ring and a hollow shaft molded therewith, said shaft comprising at least one pair of diametrically opposed slots through an outside wall surface of said shaft;
   means insertable in said shaft for receiving a dipstick blade, said insertable means comprising two pairs of diametrically opposed tab means for releasably engaging said slots;
   sealing means for engaging between said insertable means and said shaft; and
   a dipstick blade engaged with said insertable means;
   whereby said dipstick blade may be oriented in any of four directions with respect to a plane of said finger ring.

* * * * *